May 5, 1959
R. D. RUPERT
2,884,835
DOUBLE FACE REFLECTOR
Filed Dec. 19, 1956
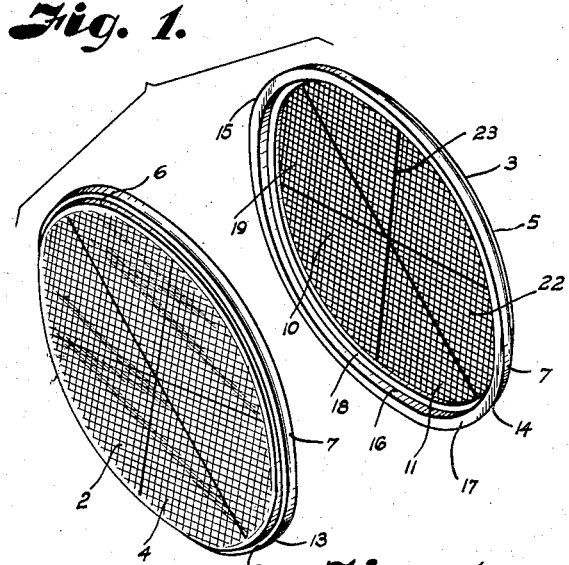
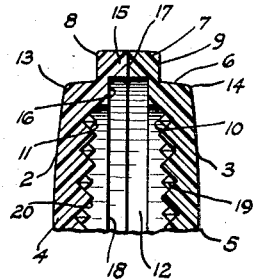
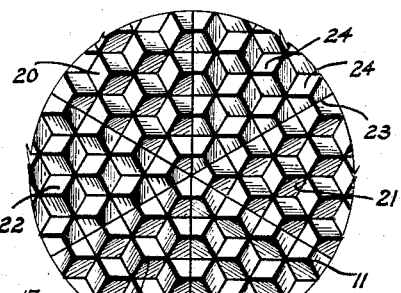
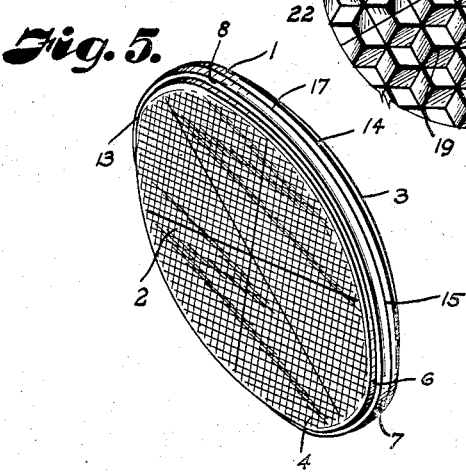
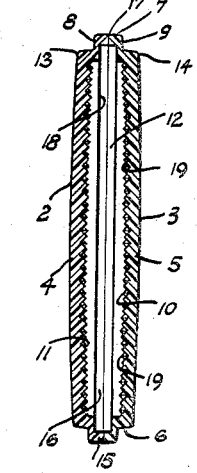
INVENTOR.
Richard D. Rupert.
BY
Fishburn and Gold
ATTORNEYS.

United States Patent Office 2,884,835
Patented May 5, 1959

2,884,835

DOUBLE FACE REFLECTOR

Richard D. Rupert, Kansas City, Mo.

Application December 19, 1956, Serial No. 629,281

4 Claims. (Cl. 88—78)

This invention relates to reflecting devices, and more particularly to reflecting devices having solid transparent reflector portions which are constructed to reflect light impinging thereon from a distant source back to the general direction of the light source, irrespective, within limits, of the angle of incidence of the impinging light.

Solid transparent reflecting devices having a series of reflecting units with reflecting surfaces arranged relatively at approximate right angles and in a circuit about the axis thereof have been used at points of danger to reflect beams of light to apprise approaching persons of the danger point or other location. Such reflecting devices may have reflecting units with each unit having three reflecting surfaces on the rear faces arranged to intersect at a common point with the reflecting surfaces at right angles to each other, such as, in effect the corner of a cube, whereby a beam of light originating in front of the reflecting device and directed toward the front face thereof impinges on such a reflecting surface and is reflected from surface to surface about the axis and back along the instant beam. Such reflecting units preferably are prismatic and have highly polished surfaces in proper angular relation to form substantially optically true congruent trihedral angles. It is common practice for such reflecting devices to have spherical front faces. Such reflectors are usually in the form of disks of glass or synthetic resin material with the individual reflecting units so closely associated that the effect is that of a single large reflector. The reflecting devices may be of the lens-reflector type or of the prismatic type which is also referred to as the central triple type. In so-called solid transparent reflecting devices having highly polished reflecting surfaces on the rear faces, dust, condensation or coatings collecting or deposited on such polished reflecting surfaces materially reduce the reflecting efficiency of the device. Single reflecting disks have been provided with covers over the rear with gaskets between the cover and edge of the reflector disk to reduce deposit of dust and other coating material on the polished surfaces. Reflector assemblies of reflecting devices to provide reflection in opposite directions or double face reflection assemblies have been utilized wherein two single reflecting disks are mounted in a holder to face in opposite directions, and in some instances, gaskets have been arranged in the mountings or between the reflector disks to reduce accumulation of dust and the like on the polished reflecting surfaces. However, in such devices, when exposed to climatic conditions, the change of temperature results in breathing or entry and escape of air in the space between the reflecting disks, and condensation forming on the polished reflecting surfaces and reduction in the reflecting efficiency of the devices. There have been attempts to provide a hermetic seal between reflecting disks molded of synthetic resin. In such attempts, solvent has been used to soften the flanges to effect adherence and seal thereof. However, in such instances, the vapors from the solvent are trapped in the space between the disks and result in checking of the polished surfaces and reduction of the reflecting power. Externally applied heat to seal the flanges is difficult to control and isolate to the surfaces to be sealed together and may cause warping or distortion of the reflecting devices and loss of reflecting power.

The principal objects of the present invention are to provide a hollow reflecting device in which the aforementioned disadvantages are substantially overcome; to provide a double face reflecting device with peripheral margins united to form a hollow hermetically sealed structure; to provide such a reflecting device with a plurality of reflecting units extending into the space and having highly polished reflecting surfaces in said closed space between the joined reflecting members; to provide such a reflecting device of circular disks having peripheral flanges that are relatively rotated whereby the friction between the adjacent flange faces heats and softens same, then the rotation is stopped and the members pressed together to unite the heated flanges and form a hermetic seal to the hollow structure; to provide such a double face reflector device wherein the reflecting units are arranged in areas and oriented for maximum reflecting efficiency with a range of inclination substantially the same in any direction from the axis of the entire reflector; and to provide a double face reflector that is economical to manufacture, with the polished reflecting surfaces protected wherein the device has a long life with continuous maximum efficiency and power of reflection.

In accomplishing these and other objects of the present invention, I have provided improved details of structure, the preferred form of which is illustrated in the accompanying drawings, wherein:

Fig. 1 is a disassembled perspective view of reflecting portions prior to uniting same.

Fig. 2 is an enlarged partial sectional view through marginal portions of a double face reflector with adjacent faces in contact.

Fig. 3 is an enlarged sectional view through the double face reflecting device after uniting of the portions thereof.

Fig. 4 is an enlarged detailed rear view of a portion of one of the reflecting members, particularly illustrating the sectional areas of reflecting units thereon.

Fig. 5 is a perspective view of the finished double face reflector device.

Fig. 6 is a transverse sectional view through the double face reflecting device.

Referring more in detail to the drawings:

1 designates a double face reflecting device embodying the features of the present invention that is circular in form and preferably having oppositely directed smooth outer faces 2 and 3. The faces 2 and 3 may be plain, convex or concave; however, in the illustrated structure, the faces are convex and substantially spherical. The faces 2 and 3 are on spaced disk-like walls 4 and 5 respectively which merge at their margins in a peripheral wall 6 adapted for fitting a suitable holder (not shown) for mounting the reflecting device and supporting same at desired locations. The peripheral wall is shouldered forming a rim 7 having side faces 8 and 9 inset from the faces 2 and 3 respectively. Each of the walls 4 and 5 has inner or rear faces 10 provided with formations 11 forming reflecting units whereby each wall 4 and 5 forms solid transparent reflecting members. The reflecting units are disposed in the hollow space 12 between the walls 4 and 5, said space 12 being hermetically sealed whereby no moisture, dust or other material may enter the space and be deposited on the reflecting surfaces.

The hollow double face reflecting device is made up of two reflecting disks 13 and 14 which are preferably molded or pressed from a suitable thermoplastic resin which may be clear or of desired colors with both members of the same color or of different colors and may have reflector formations as desired.

The walls 4 and 5 of the members 13 and 14 respectively terminate at their margins in peripheral flanges 15 extending rearwardly relative to the faces 2 and 3 respectively. The rear portion of the peripheral flanges 15 have annular recesses 16 whereby the circular flanges 15 have rear faces 17 that are preferably flat and perpendicular to the axis of the reflecting member. The faces 17 are spaced from the rear faces 18 of the recesses 16 whereby when the faces 17 of the members 13 and 14 are engaged, the walls 4 and 5 and faces 18 are spaced as illustrated in Fig. 2.

In the illustrated structure, the faces 2 and 3 are convex and the reflecting formations 11 conform generally to the contour of the front face of the respective members 13 and 14. The back or rear of each well 4 and 5 of the reflecting members have a series of prismatic reflecting units 19 of the central triple reflector type thereon, and the axes of the reflecting units are parallel. Generally, the reflector units 19 are each of the character in which a series of reflecting surfaces 20 are arranged relatively at approximate right angles and in a circuit around the reflector unit axis so that light entering the front faces of the respective reflecting members 13 and 14 from a distant source will impinge on the reflecting surfaces of the units 19 and will be successively reflected by said surfaces 20 about the axis and back in the general direction of the light source. The units are arranged whereby perimeters thereof as defined by the outer extremities of the surfaces 20 of each unit form, in effect, an hexagonal aperture or area 21 through which light originating in front of the unit and directed toward the front face passes to the reflecting surfaces.

The prismatic formation of the reflecting members is, in the illustrated structure, divided into a plurality of adjacent areas 22 by radial lines 23. The division lines are six in number forming six equal circular sector areas or groups of reflecting units 19 with the reflecting units 19 and surfaces 20 thereof arranged and oriented as shown and described in the Rupert Patent No. 2,676,518 wherein the reflecting units in any one group have the same orientation and also the reflecting units in alternate groups have the same orientation. The reflecting units 19 in diametrically opposite groups have opposed orientation. In each of the groups, the maximum range of inclination of all units lies away from the adjacent division line 23 with the minimum inclination on the other side of the axis and toward the division line. The reflecting units in each group are arranged in parallel rows 24 with the corresponding surfaces in each area lying in parallel planes. The units of each group or area are arranged in contiguous relation with the corresponding surfaces lying in parallel planes with one set of corresponding surfaces parallel to one division line and the other set of corresponding surfaces parallel to the other division line defining the respective area or group. The third set of corresponding faces in the respective group is parallel to a diametrical division line passing through the axis of the entire reflecting device at an angle of 60 degrees relative to both of the division lines defining the respective group. With this arrangement, the maximum range of inclination of the reflecting units in each of the groups lies generally toward the axis of the entire reflector member. Also, the surfaces of the reflecting units in one group which are in planes parallel to a division line are located at acute angles to corresponding surfaces of reflecting units in an adjacent area with said surfaces diverging toward the front face of the reflector member.

In use of such reflecting members, the beam of light is directed toward the front face into the reflector and is successively reflected by the surfaces of the reflecting units back through the reflector in a general direction of the light source. Therefore, in operation, the reflecting surfaces could be said to generally face the front face, and the surfaces of the reflecting units in adjacent areas which are in planes parallel to a division line therebetween are at acute angles and face toward said division line. There is no spacing between the reflecting units adjacent any division line. There is a merging of the oppositely inclined reflecting units whereby there is substantially complete reflection of the light impinging thereon. Also, the range of inclination of the reflecting units is such that the angular range or field from which the reflector will be visible is the same on either side thereof.

With the reflecting members 13 and 14 pressed or molded as described whereby the surfaces 20 of the reflecting units are highly polished and flat, the members 13 and 14 are placed with the faces 2 and 3 in opposite directions and the flange faces 17 in contact. Then the reflecting members 13 and 14 are held and relative rotation imparted thereto with said faces 17 in contact, the relative rotation being at a speed whereby the contact of the faces 17 will create a friction and heating of the portions of the flanges 15 immediately adjacent said faces 17 to a softening temperature of the resin. Then the rotation is stopped and pressure immediately applied to the flanges 15 of members 13 and 14 to force same together with sufficient force whereby the softened portions of the flanges 15 around the faces 17 will unite or weld together in a homogeneous, hermetically sealed structure. When the members are pressed together, a portion of the resin will be forced outwardly from between the flanges 15 as at 25 and 26. The pressure is maintained until the heated areas cool and harden, and then the bead as at 25 is dressed off to provide a substantially smooth outer surface at the joint. The friction during rotation quickly heats the flanges at the surfaces 17 whereby the heat is substantially isolated in the flanges 15 and no warpage of the walls 4 and 5 can occur. Also, during the uniting operation, the air is trapped between the walls 4 and 5 in the space 12, but that air remains constant as no breathing occurs whereby no dust, condensation or other coating is deposited on the highly polished reflecting surfaces 20 during use of the double face reflecting device.

The double face reflecting device when assembled and with the flanges 15 sealed to form the unitary hollow structure thereof is then ready for suitably mounting the same as desired for reflecting light beams from opposite directions to provide signals of either the fixed or portable type.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A reflecting device comprising, two circular plates coaxially arranged and formed of thermoplastic resin, said plates having integral engaging marginal portions with registering flat surfaces disposed in a plane normal to the axis of said plates and providing a continuous seam and forming a cavity between the plates, and at least one of said plates having formations on the cavity side of said plate and forming reflecting areas extending closely adjacent the engaging marginal portions of the plates, said marginal portions being welded together across the entire area of said engaged flat surfaces by frictional heat created by relative axial rotation with said registering surfaces engaged to soften same and then uniform pressure at said marginal portions to form an integral homogeneous bond hermetically sealing the cavity between said circular plates.

2. A reflecting device comprising, two circular plates coaxially arranged, one of said circular plates having formations on the face thereof adjacent the other circular plate and forming reflecting areas, a peripheral flange surrounding the reflecting area on said one circular plate and extending therefrom forming a recess in the rear of the respective circular plate, said peripheral flange and the other circular plate both having engaging portions formed of thermoplastic resin with registering flat marginal surfaces spaced from the formations on the face of the reflecting area and in a plane perpendicular to the axis of the circular plate with said marginal surfaces welded together across the entire area of said engaged flat surfaces by frictional heat created by relative axial rotation with said registering surfaces engaged to soften same and then uniform pressure at said surfaces to form an integral homogeneous bond hermetically sealing said marginal surfaces together whereby the peripheral flange and the circular plates define a hollow reflecting structure with a closed cavity between said circular plates.

3. A double face reflecting device comprising, a pair of oppositely facing coaxially arranged circular reflecting plates formed of thermoplastic resin and each having convex outer faces and corresponding concave inner faces with prismatic formations on their inner faces forming reflecting areas, and peripheral integral flanges coaxial with the circular plates and surrounding the respective reflecting areas and extending inwardly therefrom and forming a recess in the rear of the respective circular plates, said peripheral flanges having substantially flat rear faces spaced from the inner faces of the circular plates and in a plane perpendicular to the axes of the circular plates with said rear faces welded across the entire area of said engaged rear faces by frictional heat created by relative axis rotation with said rear faces engaged to soften same and then uniform pressure at said rear faces to form an integral homogeneous bond hermetically sealing said flanges together whereby the flanges and circular plates define a hollow reflecting structure with a closed cavity between said circular plates.

4. A double face reflecting device of thermoplastic resin comprising, a hollow body having spaced disk-like portions, said disks being substantially circular and coaxial with each having inner and outer faces with the outer faces facing oppositely, a plurality of radial division lines in each of said inner faces and extending outwardly from the center thereof to define a plurality of adjacent reflector areas on said inner faces and arranged in circuits about a reflector axis extending through the center of the disk-like wall portions and perpendicular to the inner faces thereof whereby the reflector areas are in multiples of opposed circular sectors, each reflector area being composed of a series of contiguous successive rows of reflecting units in each reflector area, and a peripheral wall integral with the disk-like wall portions and surrounding the reflecting areas, said peripheral wall being formed of peripheral flanges each being in a circle of equal size on the respective disk-like wall portions and extending inwardly therefrom and having substantially flat inner faces in a plane perpendicular to the axes of the disk-like portions with each said inner face engaged with the inner face of the other peripheral flange and sealed thereto across the entire area of said engaged inner faces in response to frictional heat created by relative axial rotation with said inner faces engaged to soften same and then uniform pressure at said inner faces to form an integral homogeneous weld therebetween whereby said peripheral wall and disk-like wall portions cooperate to define a hermetically sealed closed cavity between said disk-like wall portions.

References Cited in the file of this patent

UNITED STATES PATENTS

| | | |
|---|---|---|
| 2,148,315 | Wright | Feb. 21, 1939 |
| 2,261,688 | Luce et al. | Nov. 4, 1941 |
| 2,270,270 | Clare | Jan. 20, 1942 |
| 2,361,319 | Paul | Oct. 24, 1944 |
| 2,421,277 | Luce | May 27, 1947 |
| 2,676,518 | Rupert | Apr. 27, 1954 |
| 2,703,773 | Stimson | Mar. 8, 1955 |
| 2,791,938 | Doolittle et al. | May 14, 1957 |